3,078,192
METAL CARBURIZING METHOD
Gerhard W. Ahrens, Brooklyn, N.Y., assignor of one-half to Harry Ernest Rubens, New York, N.Y.
No Drawing. Filed Oct. 20, 1959, Ser. No. 847,476
1 Claim. (Cl. 148—16.5)

This invention relates to a carburizing method for metals such as iron, steel and alloys thereof.

Presently used carburizing materials require long carburizing periods. They form soot in the carburizing chamber which retards the case formation and extends the carburizing periods. These known carburizing materials form carbon and are required to react with other gases to produce carbon monoxide, which is the active carburizing agent.

Accordingly, the object of my invention is to provide a carburizing method which uses a material decomposable entirely into large quantities of carbon monoxide, the principal carburizing agent.

Other objects are to provide such a method which is not more expensive than present commercial carburizing processes, which requires less time, and which is easier to handle.

Other objects will become apparent and the novel results accomplished upon a consideration of the following description and claims.

I have found that when iron, steel and their alloys are heated to the carburizing temperature, furane derivatives will decompose entirely into carburizing gases, producing a hard case in less time than previously known carburizing agents without the latter's soot formations.

The furane derivatives possess a relatively highly reactive carbonyl group in a readily substituted 5-position with mono-atomic oxygen on conjugated double bonds. It is this structure which undergoes radical changes, for instance, by heating which can cause a rupture of the furane nucleus.

For example, the pyrolytic decomposition of furfural, a furane derivative, starting at 1050° F. and being completed after three hours at 1652° F. when used in a quantity of 115 grams, heated in a quartz tube (or two hours at 1750° F.), forms 80% carbon monoxide; 3% carbon dioxide; 6.5% unsaturated hydrocarbon gases and 10% hydrogen and saturated hydrocarbon gases. This is by far a larger amount of carbon monoxide gas produced by pyrolytic decomposition than by any other previously known decomposing carburizing agent.

Thus the carburizing agent, namely the furane derivative, provides during its decomposition a relatively lasting stream of carburizing gases extremely rich in carbon monoxide, and which is free of residues that may impair the carburizing process.

The furane derivatives may be supplied in liquid form, such as furfural, adsorbed by a porous, inert carrier, or it may be supplied to a carburizing chamber in amounts sufficient to maintain in the chamber a sufficient carburizing atmosphere and at desired pressures.

Examples of useful furane derivatives are: Furfural; furan; furfuryl alcohol; tetrafurfuryl alcohol; furfuryl acetate; furoic acid; tetrahydrofurfuryl acetate; tetrahydrofurfuryl benzoate; furfuryl propionate; furfuryl diacetate; ethyl-furoyl-acetate; furfural acetone.

In carrying out the novel process involving an inert carrier, I have employed activated alumina.

A few examples are presented to illustrate the invention more clearly:

*Example 1*

24 lbs. of activated alumina in the form of balls of ¼ inch diameter, or between ¼ inch and ⅝ inch diameter, were adsorbed with 16 lbs. of furfural. The container in which the adsorption was performed had to be cooled on account of the development of exothermic heat during the adsorption of furfural into the activated alumina. An article made of soft SAE steel 1015, of a size 6 x 6 inches and 3 inches in thickness, was packed into the alumina adsorbed with furfural contained in a properly sealable carburizing pot of one cubic foot capacity. The carburizing pot was then properly sealed and placed into a temperature-controlled standard heating furnace, e.g. of the pusher type, and heated therein to 1640° F. for a period of four hours. After cooling the furnace down to 1325° F., the carburizing pot was removed from the furnace, opened and the article taken out for further treatments. A carbon case of one millimeter depth was attained. There was found no shrinkage or loss in the volume of the alumina material supporting the article during the curburizing period and the article showed no warpage or deformation. It was possible to leave the not fully depleted alumina material in the carburizing pot and subjecting same therein to a readsorption procedure with a new charge of 10 lbs. of furfural, which was the amount used up in the carburizing processing operation. The re-charged alumina was immediately ready for re-use.

For carrying out the novel process by supplying the furane derivative to a carburizing chamber at a controlled rate in amounts sufficient to maintain in the chamber a sufficient carburizing atmosphere and at the desired pressures, the following examples are given:

*Example 2*

Activated alumina was used here to provide a carrier for a supply of furfural sufficient to get the process started. For example, I employed four lbs. of the carrier material in the form of a bottom bed carrying ½ lb. of furfural adsorbed thereto. An article made of a soft steel SAE 1015, of a size 4 x 5 x 1 inches, was supported in a carburizing chamber upon such a bed of furfural containing carrier material and the temperature in the chamber raised to 1700° F. After ½ hour, the addition of furfural was started by introducing same drop by drop through an automatically operating and measuring feeding device, allowing the approximately further addition of one and one-half lbs. of furfural into the chamber during the next 2 hours. Following this, the steel plate was removed from the carburizing chamber and found to possess the desired case depth of ¹⁄₁₆ of an inch, with a carbon content of between .50% and the eutectic and not exceeding the latter at the surface. The alumina bed was permitted to remain in the chamber for re-use without further treatment, as it contained sufficient furfural to start up additional carburizing treatments in the same chamber of 1 cubic foot size.

*Example 3*

In another example, I employed a furane derivative without the presence of carrier material forming a bed at the bottom of the carburizing chamber. An article made of soft steel SAE 1020, of a size measuring 4 x 5 x 2 inches, was suspended in the carburizing chamber and the temperature raised to 1700° F. As soon as this temperature was reached, the introduction into the furnace chamber of mixed furfural and furfuryl alcohol was started and continued for a period of 2 hours drop by drop via an automatically operating and measuring feeding device and sufficient to form and maintain in the carburizing chamber a carburizing atmosphere with a constant, positive carburizing gas pressure. 2½ lbs. of an admixture of furfural and furfuryl alcohol, composed of ¼ lb. of furfuryl alcohol and 2 and ¼ lbs. of furfural were fed during the 2 hour heating period into the chamber, from which the article was subsequently removed and found to possess the desired case depth of ¹⁄₁₆ of an inch. The carburizing chamber was clean.

The decomposition of the furane derivatives is catalytically speeded up in the presence of various metallic impurities or intentionally added metal ions in a steel such as chromium; vanadium; tungsten; manganese, nickel and the like.

In the foregoing, I have disclosed a novel process for carburizing articles made of iron, steel and alloys thereof, involving a furane derivative, the furane derivatives being decomposable directly into the highest known source of carbon monoxide by reason of the highly reactive carbonyl group in a readily substituted 5-position with monoatomic oxygen on conjugated double bonds therein which, representing the furane nucleus, is ruptured by the application of heat alone.

Impurities present in iron and steel actually assist in the decomposition of the furane derivatives and help speed carburization rates, whereas these rates are reduced with the use of other carburizing materials.

The process of feeding the furane derivatives directly into the heating chamber utilizes the exothermic heat liberated by the rupture of the furane nucleus to assist in raising the temperature in the heated chamber, thus, reducing costs. Other savings are in the carburizing cycle which is shortened by my process, as well as in the use of carrier materials which is 100% re-usable where activated alumina is used which is clean and easier handled than any other carrier material known to the art.

It is evident that numerous modifications in the above disclosures suggest themselves to those skilled in the art.

What I claim is:

Method of carburizing articles made of iron, steel and alloys thereof, comprising heating said articles and maintaining same at a temperature above the critical carburizing temperature in a heated chamber in the presence of a decomposable liquid carburizing material adsorbed onto activated alumina particles, and heating the chamber for a sufficient period of time to decompose the liquid carburizing material and carburize said articles to the desired case depths.

References Cited in the file of this patent

UNITED STATES PATENTS

| | | |
|---|---|---|
| 2,219,005 | Daeves et al. | Oct. 22, 1940 |
| 2,274,671 | Daeves et al. | Mar. 3, 1942 |
| 2,329,896 | Harsch | Sept. 21, 1943 |

OTHER REFERENCES

Carburizing-ASM Symposium, held Oct. 18 to 22, 1937; page 126 relied upon.